(12) United States Patent
Kurdziel et al.

(10) Patent No.: US 7,212,638 B2
(45) Date of Patent: May 1, 2007

(54) WIRELESS CRYPTOGRAPHIC FILL SYSTEM AND METHOD

(75) Inventors: Michael Thomas Kurdziel, Rochester, NY (US); John Michael Trinidad, Menlon, NY (US)

(73) Assignee: Harris Corporation, Melbourne, FL (US)

( * ) Notice: Subject to any disclaimer, the term of this patent is extended or adjusted under 35 U.S.C. 154(b) by 896 days.

(21) Appl. No.: 10/292,442

(22) Filed: Nov. 13, 2002

(65) Prior Publication Data

US 2004/0091115 A1    May 13, 2004

(51) Int. Cl.
*H04L 9/00*    (2006.01)

(52) U.S. Cl. ..................... 380/273; 380/270

(58) Field of Classification Search ............ None
See application file for complete search history.

(56) References Cited

U.S. PATENT DOCUMENTS 4,281,216 A * 7/1981 Hogg et al. ............. 380/277
5,960,085 A    9/1999 de la Huerga
2002/0078363 A1    6/2002 Hill et al.

FOREIGN PATENT DOCUMENTS

EP    0685825    12/1995

* cited by examiner

*Primary Examiner*—Gilberto Barrón, Jr.
*Assistant Examiner*—Kristin D. Sandoval
(74) *Attorney, Agent, or Firm*—Duane Morris, LLP

(57) ABSTRACT

A wireless cryptographic fill system includes a fill device and a host portion. The fill device is configured to store one or more cryptographic keys and related data in memory therein. The host portion is coupled to a host processor, such as a secure radio configured to perform secure operations utilizing the cryptographic key. The fill device and the host portion are configured to communicate wirelessly with each other. Wireless communications may be accomplished optically, magnetically, inductively, capacitively, via radio frequency, or via bar codes. In one embodiment, the fill device is stylus-shaped, and is inserted into (or positioned proximate) the host portion to achieve wireless communications. In another embodiment, the cryptographic fill device is card shaped, and is inserted (or swiped) into a slot on the host portion to achieve wireless communications.

20 Claims, 9 Drawing Sheets

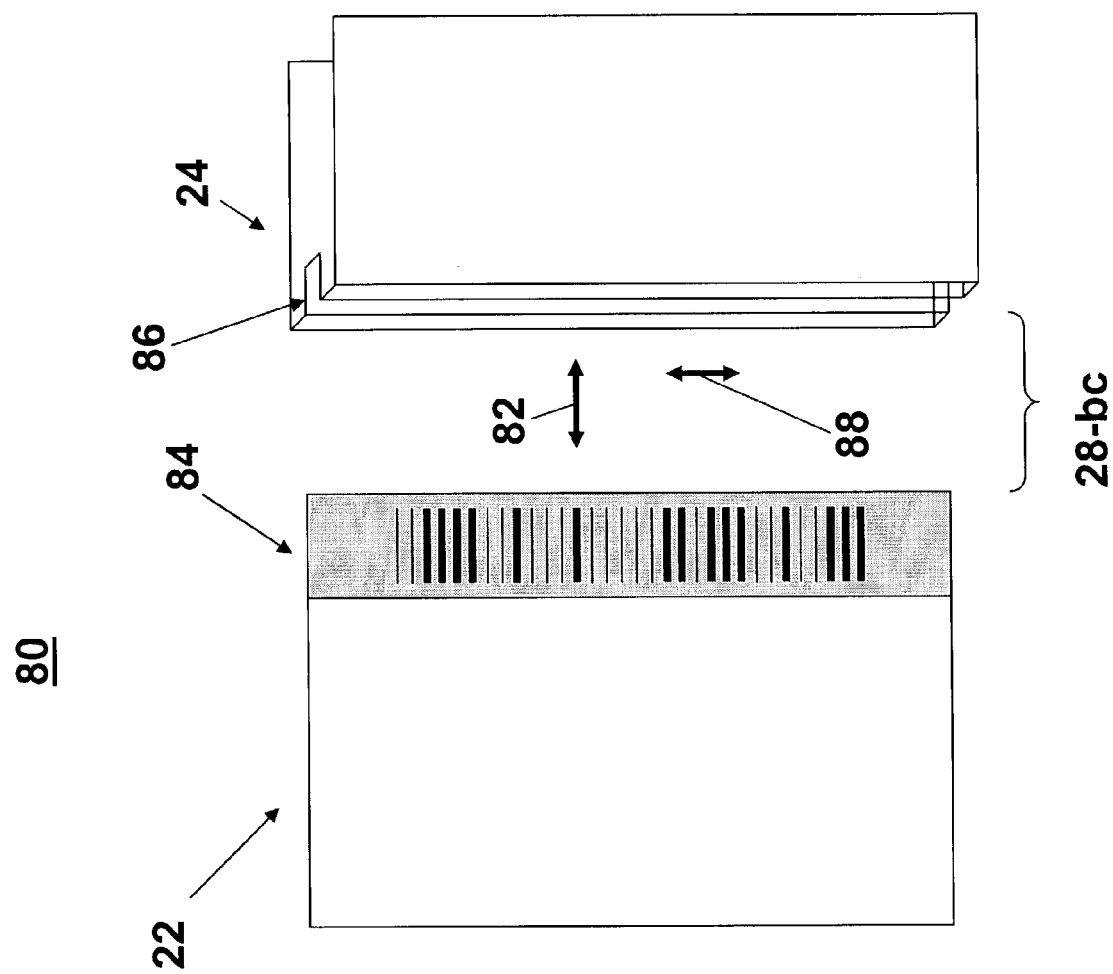

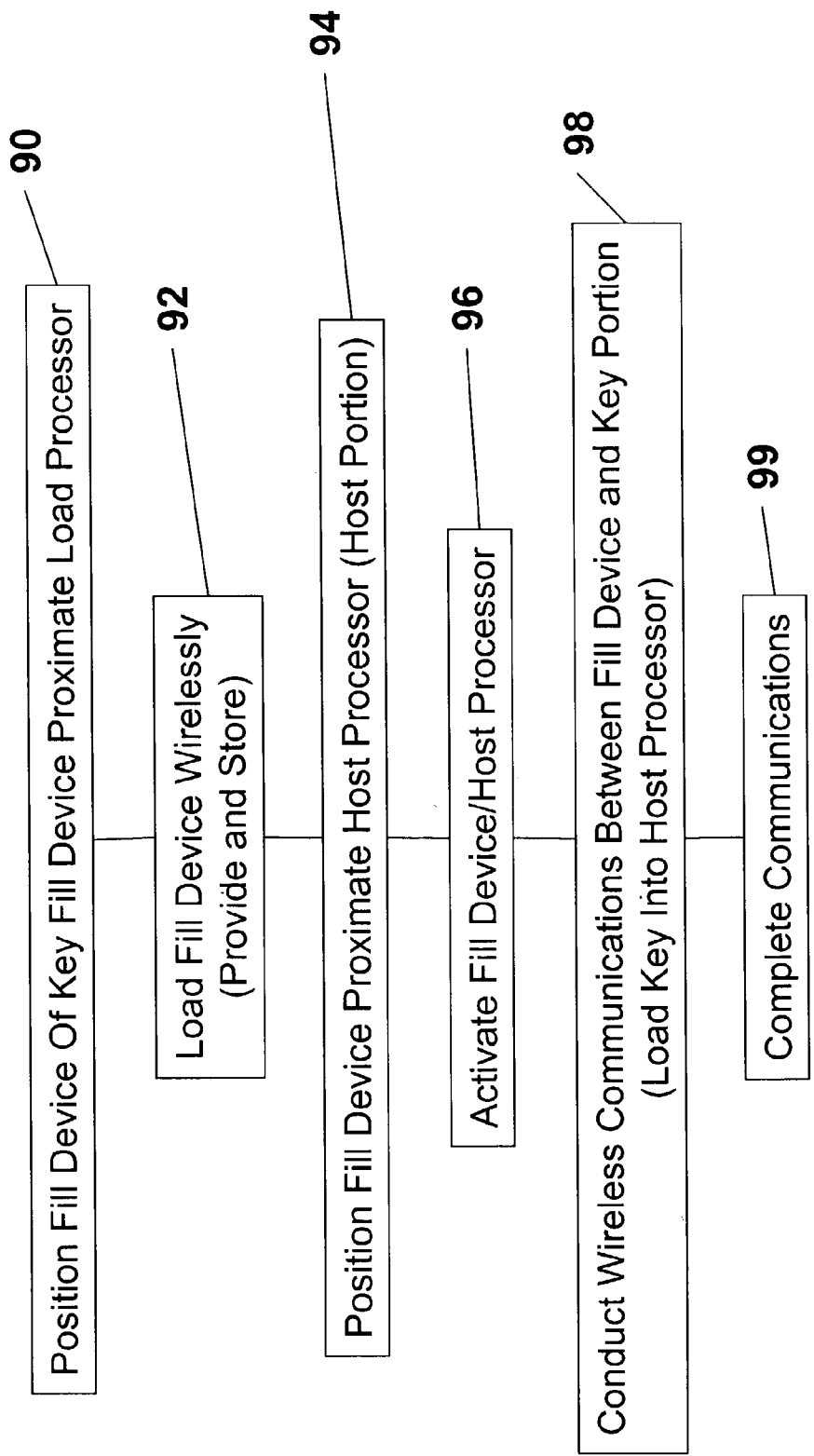

US 7,212,638 B2

WIRELESS CRYPTOGRAPHIC FILL SYSTEM AND METHOD

BACKGROUND

The present invention is generally related to secure communications systems, and more specifically related to loading cryptographic keys into equipment containing cryptographic functionality such as secure radio equipment.

As communication systems become more sophisticated with complex communication services and capabilities, it is important to keep information secure. Trends in the communication marketplace have clearly defined the need for security for both commercial and military markets. One way to keep information secure is to encrypt information prior to transmission and decrypt received information. Typically, a common cryptographic key (common to both the transmitter and the receiver) is used to encrypt and decrypt the information. However, in many systems, such as military systems, the key is kept separate from the receiver/transmitter until it is needed to ensure security in the event that the receiver/transmitter is subject to unauthorized access. In these systems, the cryptographic key is loaded (filled) into the receiver/transmitter via a fill device. When the receiver/transmitter is turned off, the cryptographic key may be erased, depending on the design of the system.

Current fill devices suffer many disadvantages. Typical fill devices are bulky, conspicuous, and not particularly suited for tactical, covert environments. The size of a typical fill device can range from approximately the size of several packs of cigarettes to the size of a laptop computer (or even larger). Fill devices for military use are known in the art. Examples include the KYK-13, AN/CYZ-10, KYX-15, and KOI-18. FIG. 1 is an illustration of the AN/CYZ-10 (prior art), also known as the Data Transfer Device.

Large, bulky fill devices are difficult for personnel to carry. This is a particular disadvantage in situations such as military operations requiring personnel to carry fill devices on maneuvers. Also, in situations in which military personnel are trying to remain inconspicuous, such as going through commercial airports during covert operations, large, bulky fill devices are easily spotted by airport security personnel, and may lead to questions being asked that could jeopardize the mission.

Current fill devices require that the fill device be mechanically connected to the transmitter/receiver via an electrical connector, such as bayonet lock connectors and threaded connectors. In the field, or during an operation in which little time is available, connecting and disconnecting the fill device to the transmitter/receiver can take too long, also possibly jeopardizing the mission. Also, these types of connectors are subject to weather conditions which may cause corrosion and interference with the operation of the connector (e.g., dirt in the threads). Furthermore, due to the covert nature of many military operations, the cables connecting the fill device with the transmitter/receiver must be shielded to prevent unauthorized disclosure of the information being transferred, e.g., the encryption key. Shielded cables and connectors tend to be heavy, bulky, stiff, and difficult to quickly connect and disconnect. Current fill devices also are not hermetically sealed due to the mechanical requirements for switches, batteries, connectors, etc. This lack of seal compromises the reliability of the internal electronics in harsh environments.

An improved cryptographic fill system is desired.

In one embodiment, a cryptographic fill system in accordance with the present invention includes a fill device configured to store one or more cryptographic keys, a host portion configured to be coupled to a host processor, and wireless communications means for providing communications between the fill device and the host portion.

In another embodiment, wherein the cryptographic fill system includes a fill device and a host portion, and the host portion is configured to be coupled to the host processor, a method for wirelessly providing a cryptographic key from a cryptographic fill device to a host processor includes positioning the fill device proximate the host portion, activating at least one of the fill device and the host portion for starting wireless communications between the fill device and the host portion, and wirelessly providing the cryptographic key to the host processor.

BRIEF DESCRIPTION OF THE DRAWINGS

In the Figures:

FIG. 8 is an illustration of a wireless cryptographic fill system comprising a card shaped wireless cryptographic fill device and bar code communications means in accordance with an embodiment of the present invention; and FIG. 9 is a flow diagram of a process for wirelessly providing a cryptographic key from a cryptographic fill device to a host processor in accordance with an embodiment of the present invention.

DETAILED DESCRIPTION

Figure 1:
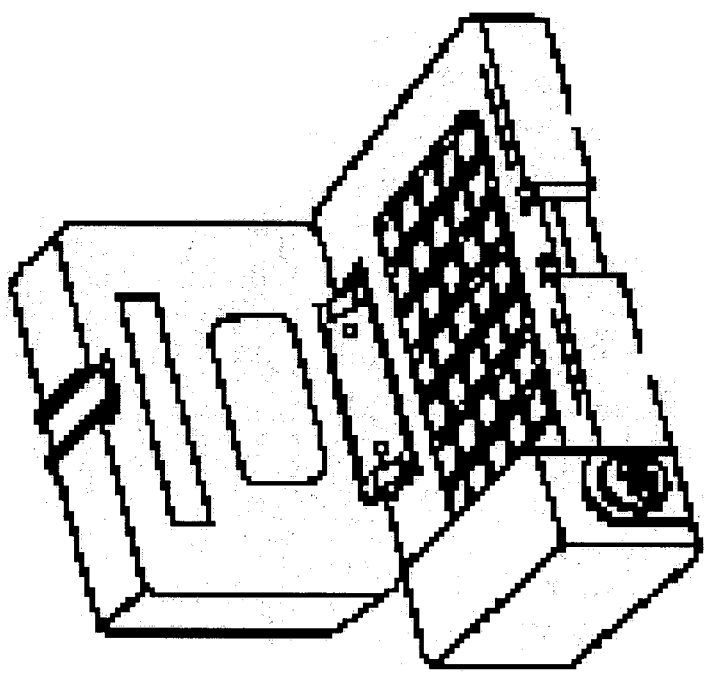
FIG. 1 (Prior Art) is an illustration a current Data Transfer Device, designated the AN/CYZ-10.
Figure 2:
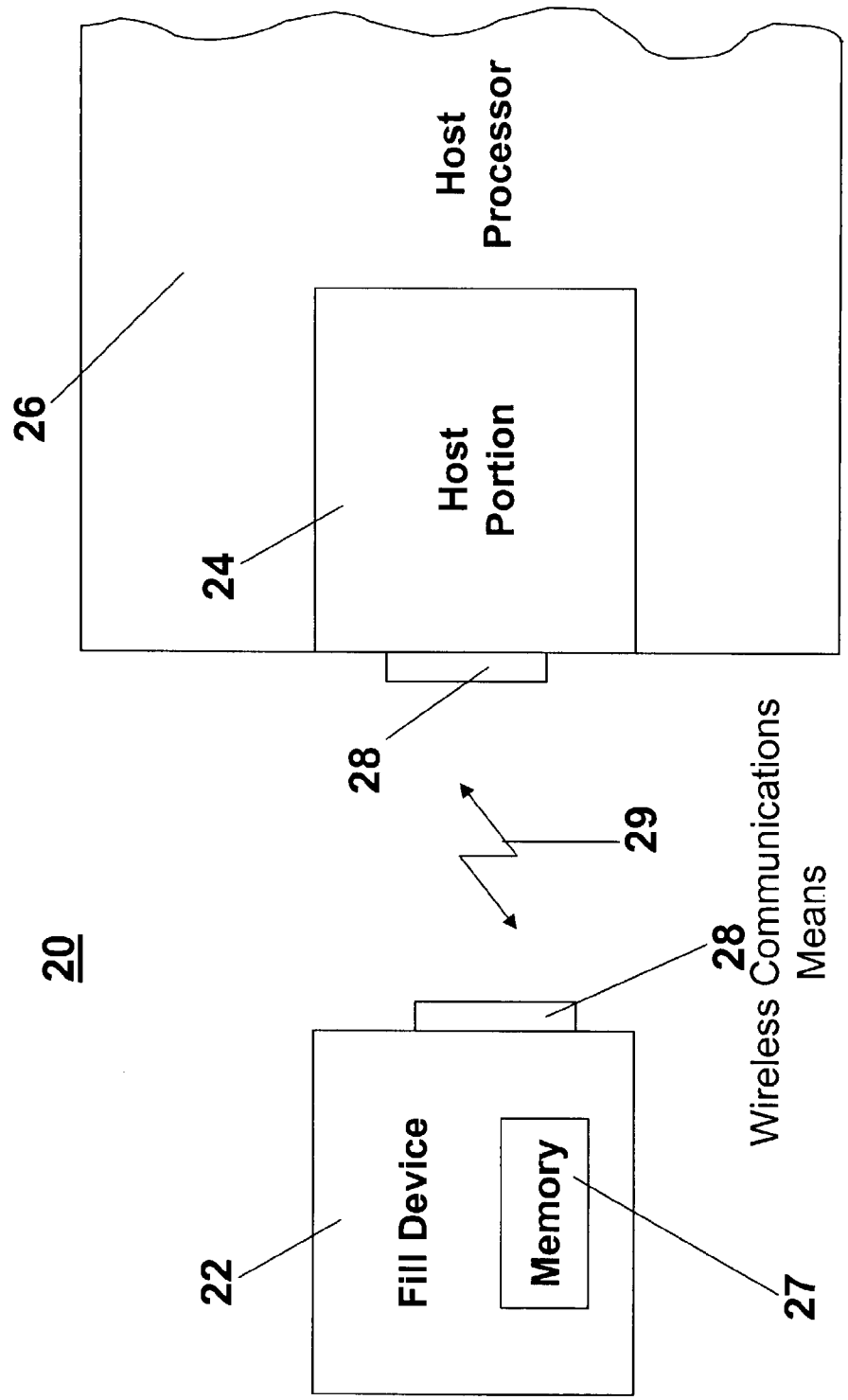
FIG. 2 is a functional block diagram of a wireless cryptographic fill system in accordance with the present invention.

Referring now to FIG. 2, there is shown a functional block diagram of a wireless cryptographic fill system 20 comprising a wireless cryptographic fill device 22, a host portion 24, and wireless communications means 28. The wireless communications means 28 is configured to convey a wireless signal 29 between portions thereof. The fill device 22 is configured to receive and store one or more cryptographic keys in memory 27 therein. The host portion 24 is configured to be communicatively coupled to the host processor 26. The host processor 26 may be a secure radio (or any other equipment containing cryptographic functionality) configured to perform secure operations utilizing the cryptographic key, for example, or the host processor 26 may be a load processor for loading the cryptographic key into the wireless fill device 22. As described in more detail below, the fill device 22 and the host portion 24 are configured to communicate wirelessly with each other via wireless signal 29, optically, magnetically, inductively, capacitively, via electromagnetic radiation (e.g., radio frequency, RF, very high frequency, VHF, ultra high frequency, UHF, microwave), via bar codes, or a combination thereof. In various embodiments, the cryptographic fill device 22 is stylus shaped, and is inserted into (or positioned proximate) the host portion 24 to achieve wireless communications (See FIGS. 3, 4, 5, and 6). In another embodiment, the cryptographic fill device 22 is card shaped, such as a credit card or a smart card, and is inserted (or swiped) into a slot on (or placed proximate) the host portion to achieve wireless communications (See FIGS. 7 and 8).

Referring again to FIG. 2, the memory 27 is configured to receive and store the cryptographic key. The cryptographic key may be permanently stored in the memory 27, or the cryptographic key may be written and rewritten into the memory 27. In one embodiment, the cryptographic key is loaded into the memory 27 as needed, thus allowing the cryptographic key to be modified as desired for a particular use. To load a cryptographic key into the memory 27, the host processor 26 functions as a load processor. The load processor may be any appropriate processor, such as a general purpose computer, a laptop computer, a desktop computer, a special purpose processor, or a combination thereof, for example, for providing a desired cryptographic key to the wireless fill device 22. The load processor provides the cryptographic key to the host portion 24. The host portion 24 and the load processor may be communicatively coupled by any appropriate means, such as mechanically, electrically, electromagnetically, optically, via radio frequency, via bar codes, or a combination thereof. The host portion 24 provides the cryptographic key to the fill device 22 via wireless communications means 28. The fill device 22 receives the cryptographic key and stores it in the memory 27.

Once the memory 27 contains a cryptographic key, the wireless fill device 22 may be utilized to provide the cryptographic key to a host processor 26, which is configured to utilize the cryptographic key. In this situation, the host processor may be any appropriate processor, such as a secure radio, a standalone cryptographic equipment, a general purpose computer, a laptop computer, a desktop computer, a special purpose processor, or a combination thereof, for example, configured to receive the cryptographic key. The wireless fill device may be configured in any appropriate shape and size, such as a stylus (e.g., pen, pencil, penlight) or a card (e.g., credit card or smart card), for example.

Figure 3:
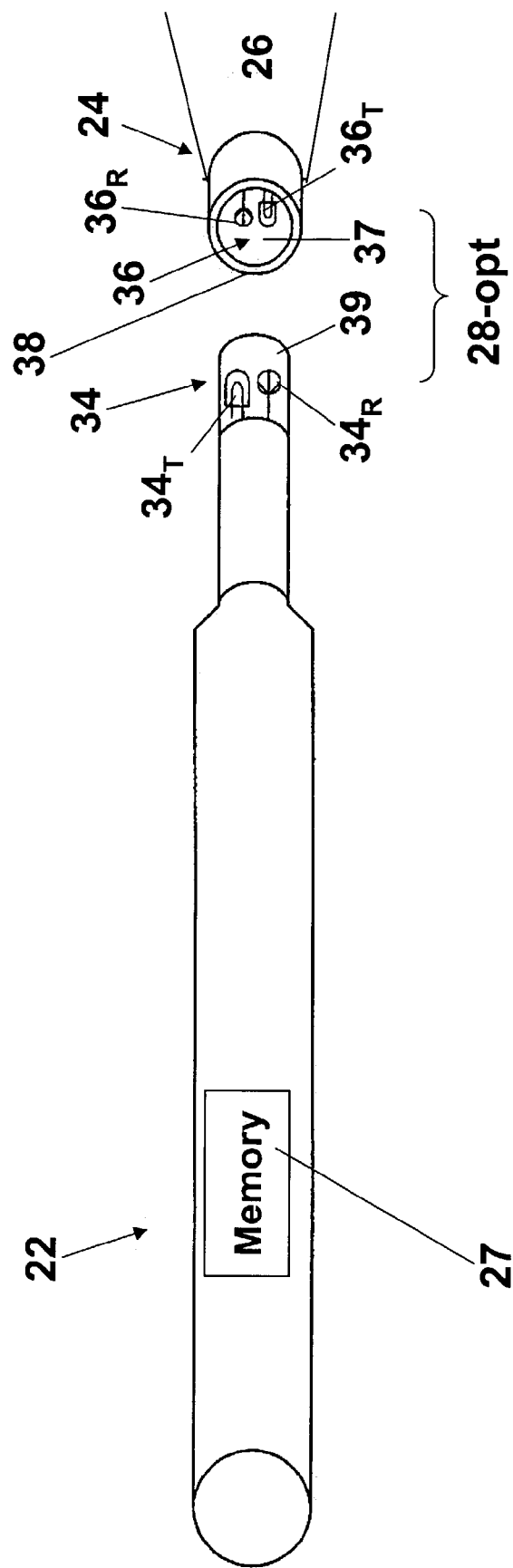
FIG. 3 is an illustration of a wireless cryptographic fill system comprising a stylus shaped wireless cryptographic fill device and optical communications means in accordance with an embodiment of the present invention.

FIG. 3 is an illustration of an embodiment of a wireless cryptographic fill system 30 comprising a stylus-shaped fill device 22, host portion 24, and optical communications means 28-opt. The optical communications means 28-opt comprises a fill device transmitter/receiver 34 and a host portion transmitter/receiver 36. A small, lightweight, easily concealed wireless fill device, such as this is particularly advantageous in various military scenarios. For example, a military radioman may take the wireless fill device 22 to a secure area, in which a load processor 26 is located. The radioman will place the wireless fill device 22 proximate the load processor 26, which is communicatively coupled to a host portion 24, to wirelessly download a specific cryptographic key into the memory 27 of the fill device 22 via wireless communications means 28-opt. Once the cryptographic key is stored in the memory 27, the radioman may put the wireless fill device 22 in her pocket. The radioman then goes to the airport, to fly to a destination to carry out her mission. Because the wireless fill device 22 is stylus-shaped, it does not prompt airport security personnel to question the radioman about her mission. On her mission, out in the field, prior to using her secure radio 26 to perform secure communications, she will take the wireless fill device 22 out of her pocket and place it proximate the radio (host processor 26), which is communicatively coupled to a host portion 24, and communicate the cryptographic key to the secure radio 26 via the wireless communications means 28-opt.

Referring again to FIG. 3, each transmitter/receiver 34, 36, possesses the capability to transmit and receive information (e.g., information pertaining to the cryptographic key). In one embodiment, fill device transmitter/receiver 34 comprises an optical transmitting device $34_T$ and a receiving device $34_R$, and host portion transmitter/receiver 36 comprises an optical transmitting device $36_T$ and a receiving device $36_R$. Optical transmitting devices $34_T$ and $36_T$ may comprise any appropriate optical transmitting device, such as a laser, a laser diode, a light emitting diode (LED), visible light, infrared light, or a combination thereof, for example. Optical receiving devices $24_R$ and $26_R$ may comprise any appropriate optical receiving device, such a light sensor, an optical detector, or a combination thereof, for example.

In the embodiment depicted in FIG. 3, the host portion 24 comprises a shroud 38. The shroud 38 of the host portion 24 and the transmitter/receiver 34 of the fill device 22 are configured such that the transmitter/receiver 34 may be inserted into the shroud 38. Inserting the transmitter/receiver 34 into the shroud 38 allows communications between the fill device 22 and the host portion 24 to be protected from unauthorized access/monitoring. The shroud 38 is optional. The shroud 38 may be omitted if unauthorized access/monitoring is not a concern or if environmental conditions make this impractical. In one embodiment, the shroud 38 is opaque to prevent inadvertent emission of optical energy. Furthermore, the transmitter/receiver 34 and the transmitter/receiver 36 may be covered, or sealed (e.g., hermetically sealed). Sealing the transmitter/receiver 34 and the transmitter/receiver 36 protects the transmitting devices $34_T$, $36_T$, and the receiving devices $34_R$, $36_R$ from weather, debris, moisture, and the like. In one embodiment, the fill device transmitter/receiver 34 is sealed by transparent (or translucent) cover 39 and the host portion transmitter/receiver 36 is sealed by transparent (or translucent) window 37, positioned within the shroud 38.

Figure 4:
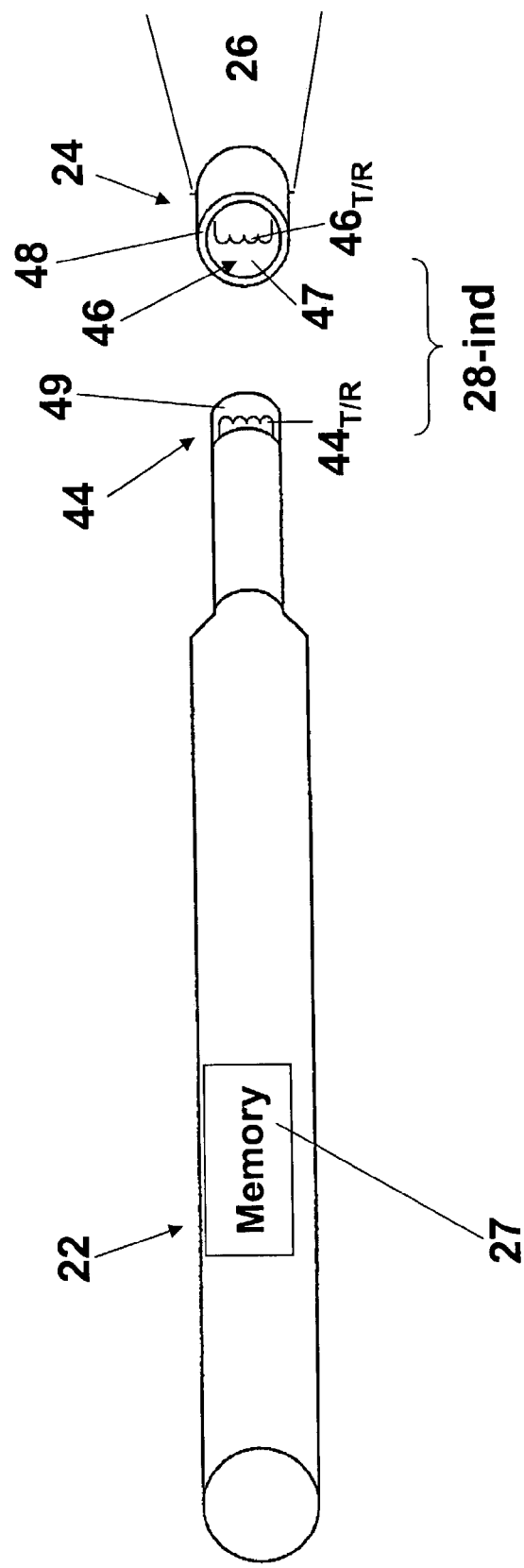
FIG. 4 is an illustration of a wireless cryptographic fill system comprising a stylus shaped wireless cryptographic fill device and inductive communications means in accordance with an embodiment of the present invention.

FIG. 4 is an illustration of an embodiment of a wireless cryptographic fill system 40 in accordance with the present invention comprising a stylus-shaped fill device 22, host portion 24, and inductive communications means 28-ind. Each transmitter/receiver 44, 46, possesses the capability to transmit and receive information (e.g., information pertaining to the cryptographic key). In one embodiment, fill device transmitter/receiver 44 comprises an inductive transmitting/receiving device $44_{T/R}$ capable of transmitting and receiving information via inductance (e.g., magnetic inductance). The host portion transmitter/receiver 46 comprises an inductive transmitting/receiving device $46_{T/R}$ capable of transmitting and receiving information via inductance (e.g., magnetic inductance). The inductive transmitting/receiving devices $44_{T/R}$, $46_{T/R}$ may comprise any appropriate device capable of inductively receiving and transmitting electromagnetic energy, such as coils, inductors, transformers, or a combination thereof, for example.

In the embodiment depicted in FIG. 4, the host portion 24 comprises a shroud 48. The shroud 48 of the host portion 24 and the transmitter/receiver 44 of the fill device 22 are configured such that the transmitter/receiver 44 may be inserted into the shroud 48. Inserting the transmitter/receiver 44 into the shroud 48 allows communications between the fill device 22 and the host portion 24 to be protected from unauthorized access/monitoring. In one embodiment, the shroud 48 is shielded to prevent inadvertent emission of electromagnetic energy. Furthermore, the transmitter/receiver 44 and the transmitter/receiver 46 may be covered, or sealed (e.g., hermetically sealed). Sealing the transmitter/receiver 44 and the transmitter/receiver 46 protects the transmitting/receiving devices $44_{T/R}$, $46_{T/R}$, from weather, debris, moisture, and the like. In one embodiment, the fill device transmitter/receiver 44 is sealed by cover 49 and the host portion transmitter/receiver 46 is sealed by window 47, positioned within the shroud 48. The cover 49 and the window 47 are configured to allow transmission of electromagnetic energy therethrough.

Figure 5:
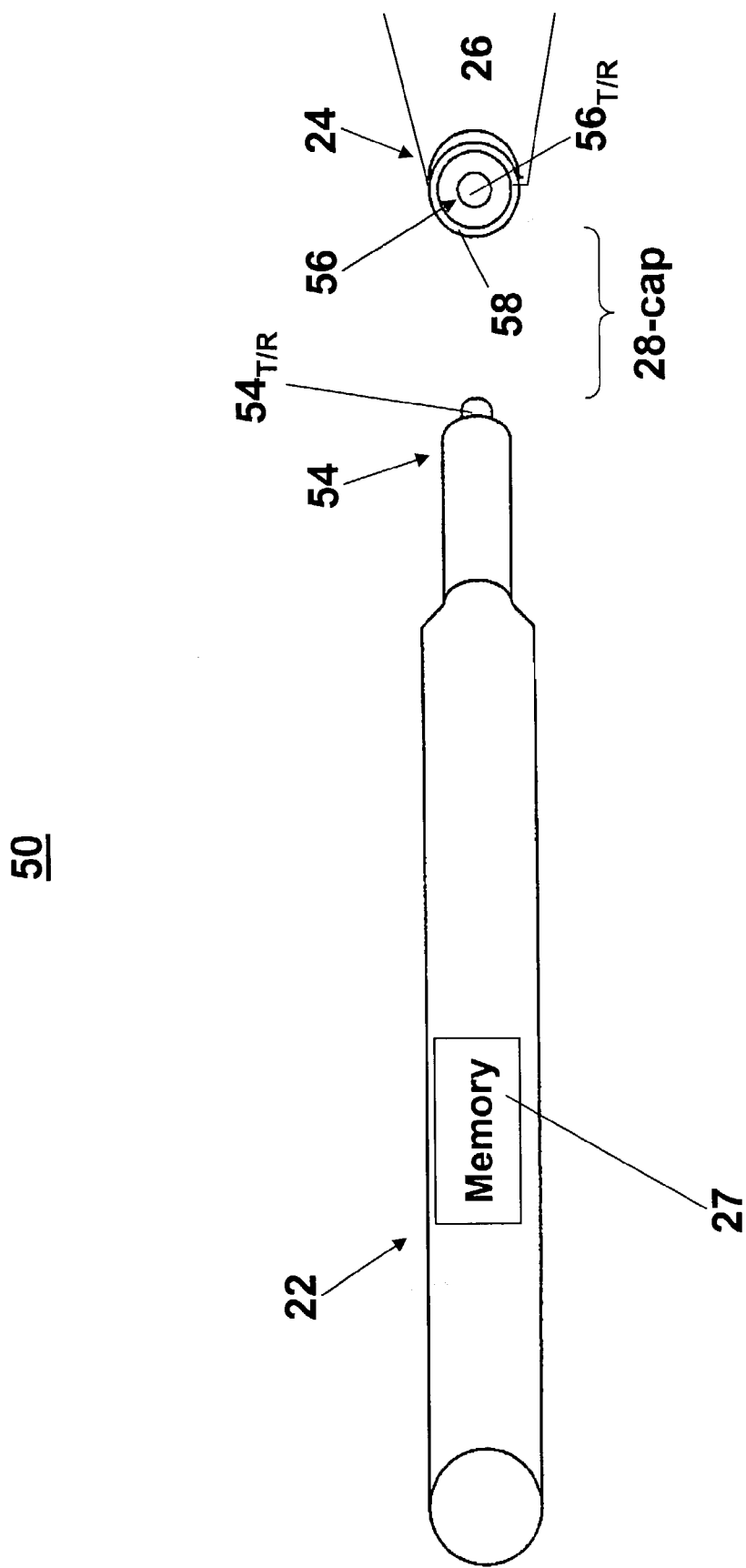
FIG. 5 is an illustration of a wireless cryptographic fill system comprising a stylus shaped wireless cryptographic fill device and capacitive communications means in accordance with an embodiment of the present invention.

FIG. 5 is an illustration of an embodiment of a wireless cryptographic fill system 50 in accordance with the present invention comprising a stylus-shaped fill device 22, host portion 24, and capacitive communications means 28-cap. Each transmitter/receiver 54, 56, possesses the capability to transmit and receive information (e.g., information pertaining to the cryptographic key). In one embodiment, fill device transmitter/receiver 54 comprises a capacitive transmitting/receiving device $54_{T/R}$ capable of transmitting and receiving information via capacitance (e.g., electrical charge). The host portion transmitter/receiver 56 comprises a capacitive transmitting/receiving device $56_{T/R}$ capable of transmitting and receiving information via capacitance (e.g., electrical charge). The capacitive transmitting/receiving devices $54_{T/R}$, $56_{T/R}$ may comprise any appropriate device capable of capacitively receiving and transmitting electromagnetic energy, such as capacitors for example.

As depicted in FIG. 5, the host portion 24 comprises a shroud 58. In one embodiment, the shroud 58 of the host portion 24 and the transmitter/receiver 54 of the fill device 22 are configured such that the transmitter/receiver 54 may be inserted into the shroud 58. In another embodiment, the shroud 58 is configured to be flush with the opening for the host portion transmitting/receiving device $56_{T/R}$, such that the fill device transmitting/receiving device $54_{T/R}$ is inserted into the opening for the host portion transmitting/receiving device $56_{T/R}$. In yet another embodiment, the transmitter/receiver 54 is inserted into the shroud 58 and the fill device transmitting/receiving device $54_{T/R}$ is inserted into the opening for the host portion transmitting/receiving device $56_{T/R}$. Inserting the transmitter/receiver 54 into the shroud 58, inserting the fill device transmitting/receiving device $54_{T/R}$ into the opening for the host portion transmitting/receiving device $56_{T/R}$, or a combination thereof, allows communications between the fill device 22 and the host portion 24 to be protected from unauthorized access/monitoring. In one embodiment, the shroud 58 is shielded to prevent inadvertent emission of electromagnetic energy. Furthermore, the transmitting/receiving device $54_{T/R}$ and the transmitting/receiving device $56_{T/R}$ may be covered, or sealed (e.g., hermetically sealed). Sealing the transmitting/receiving device $54_{T/R}$ and the transmitting/receiving device $56_{T/R}$ protects the transmitting/receiving devices $54_{T/R}$, $56_{TR/R}$, from weather, debris, moisture, and the like.

Figure 6:
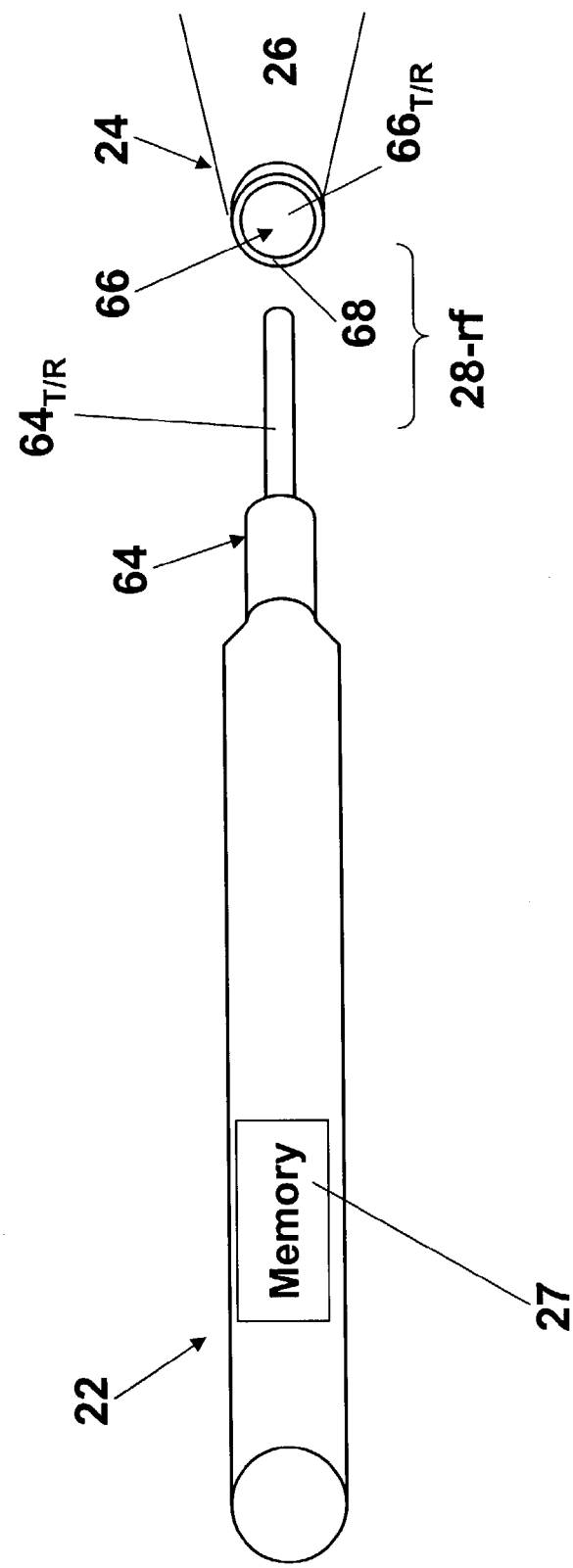
FIG. 6 is an illustration of a wireless cryptographic fill system comprising a stylus shaped wireless cryptographic fill device and radio frequency communications means in accordance with an embodiment of the present invention.

FIG. 6 is an illustration of an embodiment of a wireless cryptographic fill system 60 in accordance with the present invention comprising a stylus-shaped fill device 22, host portion 24, and radio frequency communications means 28-rf. It is to be understood, that although radio frequency communications means 28-rf is described as operating at radio frequencies, other frequencies are acceptable and appropriate, such as UHF, VHF, and microwave frequencies. Each transmitter/receiver 64, 66, possesses the capability to transmit and receive information (e.g., information pertaining to the cryptographic key). In one embodiment, fill device transmitter/receiver 64 comprises a radio frequency transmitting/receiving device $64_{T/R}$ capable of transmitting and receiving information via radio waves. The host portion transmitter/receiver 66 comprises a radio frequency transmitting/receiving device $66_{T/R}$ capable of transmitting and receiving information via radio waves. The radio frequency transmitting/receiving devices $64_{T/R}$, $66_{T/R}$ may comprise any appropriate device capable of receiving and transmitting radio frequency signals, such as antennas for example.

Figure 7:
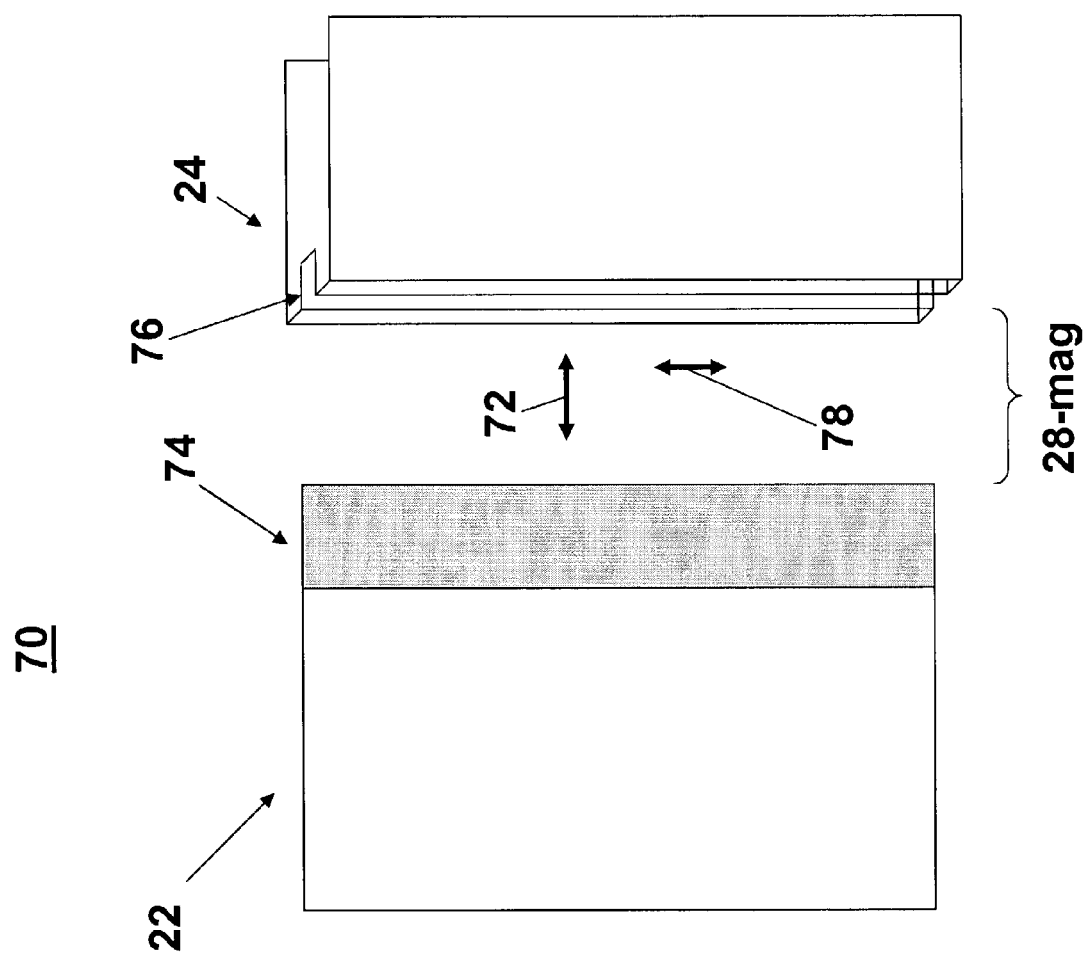
FIG. 7 is an illustration of a wireless cryptographic fill system comprising a card shaped wireless cryptographic fill device and magnetic communications means in accordance with an embodiment of the present invention.

FIG. 7 is an illustration of an embodiment of a wireless cryptographic fill system 70 in accordance with the present invention comprising a card-shaped fill device 22, host portion 24, and magnetic communications means 28-mag. Each transmitter/receiver 74, 76, possesses the capability to transmit and receive information (e.g., information pertaining to the cryptographic key). In one embodiment, fill device transmitter/receiver 74 comprises a magnetic transmitting/receiving device, such as a magnetic stripe on the card 22, capable of transmitting and receiving information magnetically. The host portion transmitter/receiver 76 comprises a transmitting/receiving device, such as a slot configured to receive the magnetic stripe on the card 22. The stripe of the transmitter/receiver 74 may be inserted into the slot of the transmitter/receiver 76 as indicated by the arrow 72, the stripe of the transmitter/receiver 74 may be swiped through the slot of the transmitter/receiver 76 as indicated by the arrow 78, or a combination thereof, to achieve communications. The transmitter/receiver 74 and the transmitter/receiver 76 may comprise any appropriate device capable of receiving and transmitting electromagnetic energy, such as magnetic and/or optical card readers (e.g., card readers at banks, or at security stations).

Inserting/swiping the transmitter/receiver 74 into the slot of transmitter/receiver 76, allows communications between the fill device 22 and the host portion 24 to be protected from unauthorized access/monitoring due to the low level of magnetic (or optical) energy needed to achieve communications. Furthermore, the transmitting/receiving device $74_{T/R}$ and the transmitting/receiving device $76_{T/R}$ may be covered, or sealed (e.g., hermetically sealed). Sealing the transmitting/receiving device $74_{T/R}$ and the transmitting/receiving device $76_{T/R}$ protects the transmitting/receiving devices $74_{T/R}$, $76_{T/R}$, from weather, debris, moisture, and the like.

FIG. 8 is an illustration of an embodiment of a wireless cryptographic fill system 80 in accordance with the present invention comprising a card-shaped fill device 22, host portion 24, and bar code communications means 28-bc. Each transmitter 84, and receiver 86, possesses the capability to transmit and receive, respectively, information (e.g., information pertaining to the cryptographic key). Bar code communications means 28-bc may convey the wireless signal 29 optically, magnetically, or a combination thereof. For example, the transmitter 84 may comprise visual bar codes that are read by an optical bar code reader 86, the transmitter 84 may comprise magnetic bar codes that are read by a magnetic bar code reader 86, or a combination thereof. In one embodiment, fill device transmitter 84 comprises a bar code transmitting device, such as a series of printed lines on the card 22, capable of transmitting information via bar codes. The host portion receiver 86 comprises a receiving device, such as a slot configured to read the bar code lines on the card 22. The bar code lines of the transmitter 84 may be inserted into the slot of the receiver 86 as indicated by the arrow 82, the bar code lines of the transmitter 84 may be swiped through the slot of the receiver 86 as indicated by the arrow 88, or a combination thereof, to achieve communications. The receiver 86 may comprise any appropriate device capable of reading bar codes (e.g., card readers at banks, or at security stations).

Inserting/swiping the transmitter 84 into the slot of receiver 86 allows communications between the fill device 22 and the host portion 24 to be protected from unauthorized access/monitoring due to the low level of energy needed to achieve communications. Furthermore, the transmitting device 84 and the receiving device 86 may be covered, or sealed (e.g., hermetically sealed). Sealing the transmitting device 84 and the receiving device 86 protects the transmitting device 84 and receiving device 86, from weather, debris, moisture, and the like.

Furthermore, it is to be understood that each of the embodiments described herein may be rendered in a hermetically sealed package with power provided to the device through wireless coupling from a host during the load and fill operations.

FIG. 9 is a flow diagram of a process for wirelessly providing a cryptographic key from a cryptographic fill device to a host processor in accordance with an embodiment of the present invention. At step 90 the fill device (e.g., fill device 22) is positioned proximate the load processor (e.g., host processor 26 functioning as a load processor) for downloading the cryptographic key to the cryptographic fill device. The host portion of the cryptographic fill system is communicatively coupled to the load processor (e.g., the host portion 24 being coupled to the host processor 26). The cryptographic key is wirelessly downloaded to the cryptographic fill device at step 92. The cryptographic key may be downloaded by any appropriate wireless communications means, such as described above. The proximity of the cryptographic fill device to the host processor needed to achieve wireless communications is determined by the nature of the wireless communications (e.g., optical, inductive, capacitive, magnetic, via radio frequency electromagnetic radiation, via UHF electromagnetic radiation, via VHF electromagnetic radiation, via microwave electromagnetic radiation, via bar codes, infrared, combinations thereof) and the power of the respective transmitters/receivers. The cryptographic key is also stored in memory (e.g., memory 27) of the cryptographic fill device at step 92. At step 94, the fill device of the cryptographic fill apparatus is placed proximate the host processor (e.g., a secure radio) for providing the cryptographic key to the host processor. The cryptographic fill device, the host processor, or both are activated at step 96. Activation includes preparing the respective entity (e.g., cryptographic fill device and/or the host processor) for wirelessly communicating the cryptographic key. Activation may be accomplished by any appropriated means, such as a switch on the cryptographic fill device (e.g., pocket clip portion of stylus shaped fill device), a switch on the host processor, or a combination thereof. Wireless communications between the fill device and the host processor to communicate the cryptographic key is performed at step 98. This wireless communications may be achieved by any appropriate wireless communications means, such as described above. Once the cryptographic key is provided to the host processor the communications between the cryptographic fill device and the host processor are completed at step 99. This may be accomplished by deactivating the cryptographic fill device, by deactivating the host processor, by deactivating both the cryptographic fill device and the host processor, or by simply removing the cryptographic fill device from the proximity of the host processor, or a combination thereof. In one embodiment, a signal is provided, such as an audio and/or visual signal, indicating that the cryptographic key has been provided to the host processor and wireless communications are complete.

Although illustrated and described herein with reference to certain specific embodiments, the wireless cryptographic fill device as described herein is nevertheless not intended to be limited to the details shown. Rather, various modifications may be made in the details within the scope and range of equivalents of the claims and without departing from the spirit of the invention. For example, communication means may also include acoustic communication means, ultrasonic communication means, mechanical communication means, or a combination thereof.

What is claimed is:

1. A cryptographic fill system comprising:
   a fill device configured to comprise at least one cryptographic key;
   a host portion configured to be communicatively coupled to a host processor; and
   a wireless communications means for providing communications between said fill device and said host portion, wherein said wireless communications means is an inductive, capacitive, magnetic, radio frequency, or bar code communications means.

2. A system in accordance with claim 1, said wireless communication means comprising capacitive communications means, wherein:
   said fill device comprises a first capacitive transmitter/receiver for capacitively communicating with said host portion; and
   said host portion comprises a second capacitive transmitter/receiver for capacitively communicating with said fill device.

3. A system in accordance with claim 1, said wireless communication means comprising inductive communications means, wherein:
   said fill device comprises a first inductive transmitter/receiver for inductively communicating with said host portion; and
   said host portion comprises a second inductive transmitter/receiver for inductively communicating with said fill device.

4. A system in accordance with claim 1, said wireless communication means comprising magnetic communications means, wherein:
   said fill device comprises a first magnetic transmitter/receiver for magnetically communicating with said host portion; and
   said host portion comprises a second magnetic transmitter/receiver for magnetically communicating with said fill device.

5. A system in accordance with claim 1, said wireless communication means comprising radio frequency communications means, wherein:
   said fill device comprises a first radio frequency transmitter/receiver for electromagnetically communicating with said host portion; and
   said host portion comprises a second radio frequency transmitter/receiver for electromagnetically communicating with said fill device.

6. A system in accordance with claim 1, said wireless communication means comprising bar code communications means, wherein:
said fill device comprises a bar code transmitter for wirelessly communicating with said host portion; and
said host portion comprises a bar code receiver for wirelessly communicating with said fill device.

7. A system in accordance with claim 1, wherein said fill device comprises memory for storing said cryptographic key.

8. A system in accordance with claim 1, wherein said host processor comprises one of a secure radio for receiving said cryptographic key and a load processor for providing said cryptographic key.

9. A cryptographic fill system comprising:
a fill device configured to comprise at least one cryptographic key;
a host portion configured to be communicatively coupled to a host processor; and
a wireless communications means for providing communications between said fill device and said host portion, wherein:
said fill device is stylus shaped; and
wireless communications are accomplished by positioning said fill device proximate said host portion.

10. A system in accordance with claim 9, said host portion further comprising a shroud, wherein said stylus shaped fill device is configured to be inserted into said shroud.

11. A cryptographic fill system comprising:
a fill device configured to comprise at least one cryptographic key;
a host portion configured to be communicatively coupled to a host processor; and
a wireless communications means for providing communications between said fill device and said host portion, wherein:
said fill device is card shaped;
said host portion comprises a slotted portion configured to receive said card shaped fill device; and
wireless communications are accomplished by inserting said card shaped fill device into said slotted portion.

12. A cryptographic fill system comprising:
a fill device configured to comprise at least one cryptographic key;
a host portion configured to be communicatively coupled to a host processor; and
a wireless communications means for providing communications between said fill device and said host portion, wherein each of said fill device and said host portion is hermetically sealed.

13. A cryptographic fill system comprising:
a fill device configured to comprise at least one cryptographic key;
a host portion configured to be communicatively coupled to a host processor; and
a wireless communications means for providing communications between said fill device and said host portion, wherein electrical power is wirelessly provided to said fill device from said host portion.

14. A method for wirelessly providing a cryptographic key from a cryptographic fill device to a host processor, said method comprising the steps of:
positioning said fill device proximate a host portion, wherein:
said host portion is configured to be communicatively coupled to said host processor;
activating at least one of said fill device and said host processor for starting wireless communications between said fill device and said host portion; and
wirelessly providing said cryptographic key to said host processor,
wherein said wireless communications comprises at least one of inductive communications, capacitive communications, magnetic communications, electromagnetic communications, and bar code communications.

15. A method in accordance with claim 14, further comprising the steps of:
positioning said fill device proximate a load processor;
wirelessly providing said cryptographic key from said load processor to said key fill device; and
storing said cryptographic key in said fill device.

16. A method for wirelessly providing a cryptographic key from a cryptographic fill device to a host processor. said method comprising the steps of:
positioning said fill device proximate a host portion, wherein:
said host portion is configured to be communicatively coupled to said host processor;
activating at least one of said fill device and said host processor for starting wireless communications between said fill device and said host portion; and
wirelessly providing said cryptographic key to said host processor, wherein each of said fill device and said host portion is hermetically sealed.

17. A method for wirelessly providing a cryptographic key from a cryptographic fill device to a host processor, said method comprising the steps of:
positioning said fill device proximate a host portion, wherein:
said host portion is configured to be communicatively coupled to said host processor;
activating at least one of said fill device and said host processor for starting wireless communications between said fill device and said host portion; and
wirelessly providing said cryptographic key to said host processor, further comprising wirelessly providing electrical power to said fill device from said host portion.

18. A wireless fill device for communicating a cryptographic key, wherein:
said wireless fill device is configured to receive said cryptographic key and retain said cryptographic key in memory therein; and:
said wireless fill device is configured to wirelessly communicate with a host portion,
wherein said wireless fill device is configured to wirelessly communicate with said host portion at least one of magnetically, inductively, capacitively, and via radio frequency.

19. A wireless fill device for communicating a cryptographic key, wherein:
said wireless fill device is configured to receive said cryptographic key and retain said cryptographic key in memory therein; and:
said wireless fill device is configured to wirelessly communicate with a host portion, wherein said fill device is hermetically sealed.

20. A wireless fill device for communicating a cryptographic key, wherein:
said wireless fill device is configured to receive said cryptographic key and retain said cryptographic key in memory therein; and:
said wireless fill device is configured to wirelessly communicate with a host portion, wherein electrical power is wirelessly provided to said fill device.

* * * * *